Nov. 17, 1942.    I. O. MINER    2,302,458
TELEMETRIC APPARATUS
Filed July 15, 1940

IRVING O. MINER
INVENTOR

BY Maxwell Barus
ATTORNEY

Patented Nov. 17, 1942

2,302,458

UNITED STATES PATENT OFFICE 2,302,458

TELEMETRIC APPARATUS

Irving O. Miner, East Providence, R. I., assignor to Builders Iron Foundry, Providence, R. I., a corporation of Rhode Island Application July 15, 1940, Serial No. 345,487

3 Claims. (Cl. 235—61)

This invention relates to telemetric apparatus and more particularly to the integration of quantity values transmitted by telemetric signals. The invention provides for the integration of telemetered quantity values with particular accuracy and precision, even though the values be small. It further provides means simple and inexpensive in construction, but none the less reliable and efficient in operation, for accomplishing this result. The invention has been found to be especially advantageous in conjunction with the integrating of weights of material on a moving conveyor, though it will be apparent that its utility is not confined to the integrating of any particular quantity values. Other features and advantages of the invention will be hereinafter described and claimed.

Figure 1:
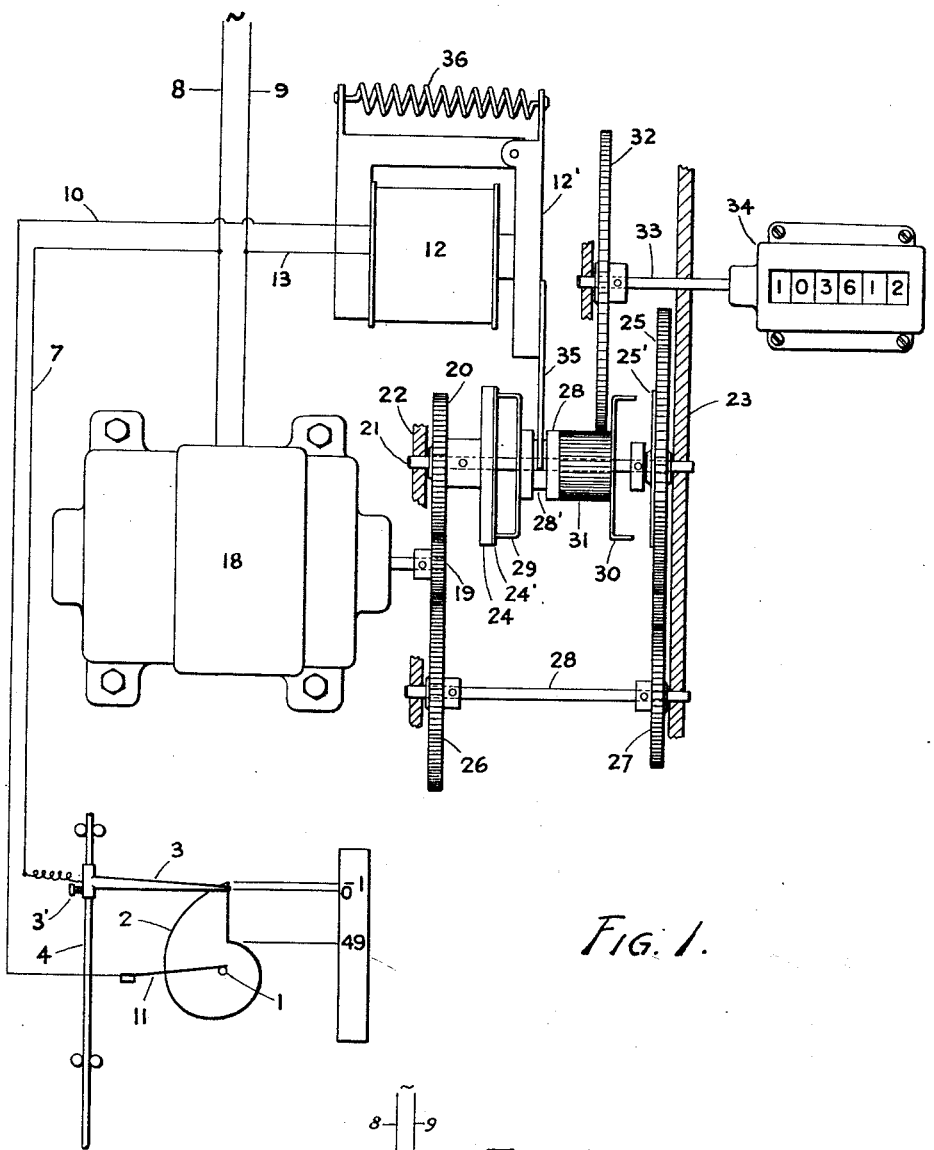
Fig. 1 is a diagrammatic view illustrating an embodiment of the invention, with parts thereof in side elevation and other parts in vertical section.

Referring to the drawing, there is shown a cam 2 of a suitable telemetric transmitter, which cam is integral with or secured to a shaft 1, continuously rotated at constant speed by any suitable means, such as a synchronous motor (not shown) as is well understood in the art. Cooperating with the cam 2, and engageable with the face thereof, is a contactor 3, carried by a rod or stem 4, which is positionable in accordance with the values of the quantity to be transmitted. Said quantity may, for example, be pressure, liquid level, temperature, weight, or flow rate of a substance.

Figure 2:
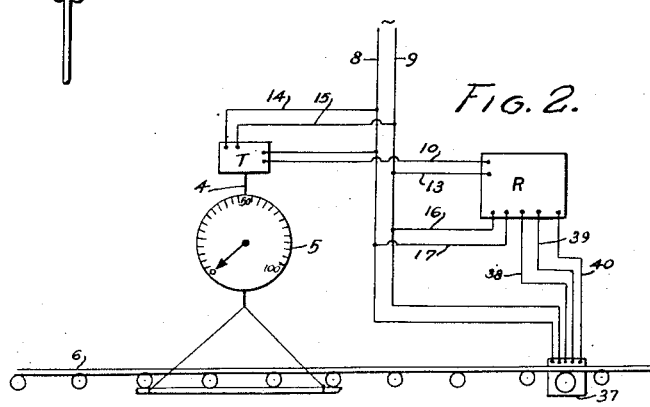
Fig. 2 is a diagrammatic view showing the invention applied to the integrating of weights of material on a traveling conveyor.

As shown in Fig. 2 by way of example, said rod 4 may be connected to a scale 5, which measures the weight of material on a traveling endless conveyor belt 6. The scale 5 may be of a well-known type in which the tare or empty belt weight is automatically eliminated in the arrangement of the scale levers, so that the rod 4 is positioned by said scale in accordance with the net weight of the material on said belt.

The contactor 3 is shown connected by a wire 7 to one of a pair of electric current mains 8, 9; while a wire 10 is electrically connected to the transmitter cam 2 through a brush 11 which engages the shaft of said cam. In Fig. 2 the transmitter apparatus is indicated generally at T.

The aforementioned wire 10 is also connected to one terminal of a solenoid 12 of the receiver apparatus (designated R in Fig. 2), the opposite terminal of which solenoid is connected by a wire 13 with the current main 9. Wires 14, 15 (Fig. 2) connected to the mains 8, 9, may lead current from said mains to the synchronous motor which drives the transmitter cam 2 continuously at constant speed; while wires 16, 17, supply current from said mains to the motor 18 of the receiver apparatus.

In each cycle of rotation of the transmitter cam 2 the period of engagement between said cam and the contactor 3 corresponds with the position of the rod 4, and hence with the quantity value represented by said position. Thus a signal of a duration corresponding with said value is sent through the circuit comprising the wires 7 and 10 in each transmitting cycle, and the solenoid 12 is energized for the duration of said signal.

The contactor 3 is adjustably mounted on the rod 4 and is also provided with a lockscrew 3', so that said contactor may be manually adjusted on said rod and locked in the desired position. Said contactor is so adjusted on said rod that when the said rod is in a position corresponding to zero value of the quantity to be transmitted, said contactor 3 engages the cam 2 for an appreciable period in each cycle of rotation of said cam. As a result, the signal in each of said cycles is of a duration equal to a constant (corresponding to zero value of the quantity) plus a duration proportional to the quantity value. For example, if the period of each cycle of rotation of the cam 2 is fifty seconds, the contactor 3 may be so set on the rod 4 that when the value of the quantity is zero a signal of a duration of one second is sent from said cam and contactor to the solenoid 12; while for other values of said quantity the duration of the signal is one second plus a duration proportional to the difference between said value and zero. By thus sending a signal to the solenoid 12 in each cycle of a duration equal to a constant plus a duration proportional to the actual quantity value, a highly accurate transmission of signals is insured even for very small values of the quantity. When the rod 4 is positioned in accordance with the net weight on the scale 5, as above described, the solenoid 12 is energized in each cycle for a time duration corresponding to the sum of a signal representing the net weight on the scale plus the constant above referred to corresponding to zero net weight.

The motor 18 of the receiver apparatus drives, through pinion 19, a gear 20 which is secured to a shaft 21 journaled in a pair of side-frame members 22 and 23. Rotatable with said gear and shaft is disk 24 having a suitable clutch facing 24'. A second gear 25 is restrained from endwise movement on the shaft 21, but is free to rotate thereon; said gear having a clutch facing 25' and being driven by motor 18 at a speed considerably reduced with respect to that of the gear 20, and in a direction opposite to that of said gear 20. For this purpose, suitable reduction gearing is interposed between pinion 19 and gear 25, said reduction gearing comprising gears 26, 27, secured to a shaft 28, said gear 26 meshing with the pinion 19 while gear 27 meshes with gear 25.

Journalled on the shaft 21, for longitudinal movement and rotation thereon, is a clutch device comprising a hub 28 and a pair of clutch elements 29, 30, engageable respectively with the clutch portions of the disk 24 and gear 25. A pinion 31 integral with or secured to said hub 28 and clutch elements 29, 30, meshes with a gear 32 which is secured to the shaft 33 of an integrator 34 of conventional type.

The gear 20 is driven in such direction as to operate the integrator additively through the pinion 31 and gear 32; while gear 25 is driven in the opposite direction, with consequent subtractive operation of the integrator when said gear is clutched thereto.

The armature 12' of solenoid 12 has extending therefrom a bifurcated arm 35 which engages a groove 28' in the clutch hub 28. As long as said solenoid is energized, the clutch element 29 is engaged with the clutch facing 24' of disk 24, but upon de-energization of said solenoid, a spring 36 swings the armature 12' to the right and brings the clutch element 30 into engagement with the clutch facing 25' of gear 25, which engagement is maintained until the solenoid 12 is again energized. Thus, in each cycle of rotation of the transmitter cam 2, the integrator 34 is clutched to the gear 20, with consequent additive actuation of said integrator, for the duration of the signal from said cam; while for the remainder of said cycle said integrator is clutched to the gear 25 and is subtractively actuated.

The speed of the subtracting drive gear 25 is so chosen with respect to that of the adding drive gear 20 that when the rod 4 stands at a position corresponding to zero value of the variable, the extent of additive operation of the integrator by said gear 20 for the duration of the transmitted zero signal is equal to the extent of subtractive operation of said integrator by the gear 25 for the period of the cycle in which cam 2 and contactor 3 are out of engagement. For example, if the cam 2 makes one revolution in fifty seconds, and the duration of the signal in the zero position of rod 4 is one-fiftieth of the cycle, the ratio of the speeds of rotation of the adding gear 20 and subtracting gear 25 is forty-nine to one. As a result, the extent of additive operation of the integrator by gear 20 for the duration of the zero signal (i. e., for one-fiftieth of the cycle) is equal to the extent of subtractive operation of said integrator by the gear 25 in the remaining forty-nine fiftieths of the cycle, the speed of said gear 25 being one-forty-ninth that of gear 20. This relation may be more generically expressed as follows:

$$\frac{\text{Speed of adding gear}}{\text{Speed of subtracting gear}} = \frac{a-b}{b}$$

where $a$ is the duration of the transmitting cycle and $b$ is the duration of the zero signal.

The following table illustrates the operation of the integrator for different loads on the scale 5, based upon one revolution of the cam 2 in 50 seconds, and one second for the duration of the "zero load" signal (i. e., the signal transmitted when belt 6 is empty).

| Load on scale (in 49ths of maximum) | Plus signal | Minus signal | Plus movement of Integrator | Minus movement of integrator | Net movement of integrator |
|---|---|---|---|---|---|
| | Seconds | Seconds | Arbitrary units | Arbitrary units | Arbitrary units |
| 0 | 1 | 49 | 49×1=49 | 1×(−49)=−49 | 0 |
| +7/49 | 8 | 42 | 49×8=392 | 1×(−42)=−42 | +350 |
| 14/49 | 15 | 35 | 49×15=735 | 1×(−35)=−35 | 700 |
| 21/49 | 22 | 28 | 49×22=1078 | 1×(−28)=−28 | 1050 |
| 28/49 | 29 | 21 | 49×29=1421 | 1×(−21)=−21 | 1400 |
| 35/49 | 36 | 14 | 49×36=1764 | 1×(−14)=−14 | 1750 |
| 42/49 | 43 | 7 | 49×43=2107 | 1×(−7)=−7 | 2100 |
| 49/49 | 50 | 0 | 49×50=2450 | 1×(−0)=−0 | 2450 |

It will be noted from a comparison of the first and last columns of the above table that the movement of the counter is proportional to the load on the scale.

Other relative durations of the zero signal, may, of course, be utilized so long as the ratio between the speeds of the adding and subtracting gears 20 and 25 is appropriately chosen.

Where the conveyor belt 6 runs at constant speed, the motor 18 may be of any desired constant speed type, such as a conventional synchronous motor. However, in practice it sometimes occurs that said belt is not operated at constant speed. When such is the case, the motor 18 is preferably driven at a speed proportional to that of said conveyor belt 6. For that purpose, said motor may be of the well known "Selsyn" type and said belt may drive a generator 37 (Fig. 2) of the "Selsyn" type which is connected to the mains 8, 9, and is also connected to motor 18 through wires 38, 39, and 40, as will be readily understood. In this way the rotation imparted to the generator 37 by the travel of the belt 6 will be continuously reproduced by said motor 18, which will then rotate in synchronism with said generator.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. A telemetric receiver comprising an integrator, means operable in an additive direction, means operable in a subtractive direction, means responsive to cyclical signals for connecting said integrator to the additively operable means for a period in each cycle corresponding to the signal therein and for connecting said integrator with the subtractively operable means for the remainder of said cycle, and means for driving said additively operable means continuously at a given speed and for driving said subtractively operable means continuously at a speed such that said subtractively operable means nullifies the action of said additively operable means upon said integrator in each cycle in which the signal determines a given minimum period of engagement between said integrator and additively operable means.

2. In a telemetric system, means movable to positions corresponding to values of a quantity, cyclically operated means cooperating with said movable means for transmitting in each of a series of uniform time cycles a signal of a duration equal to a constant plus a duration commensurate with the value of said quantity in excess of zero, a counter, an element operated in an additive direction, an element operated in a subtractive direction, means for driving said additive element continuously and for driving said subtractive element continuously at a speed which bears the same relation to that of said additive element as said constant bears to the difference between the period of each cycle and said constant, clutch means connected to said counter means brought into action by the signal in each cycle for engaging said clutch means with said additive element for the duration of said signal and means responsive to cessation of said signal for engaging said clutch means with said subtractive element for the remainder of said cycle.

3. A telemetric receiver comprising a counter, a pair of elements arranged for rotation in additive and subtractive directions about a common axis, clutch means connected to said counter, signal-responsive means for connecting said clutch means to said additively rotating element for the duration of a signal in each of a series of uniform signal cycles and for connecting said clutch means to said subtractively rotating element for the remainder of each cycle, and motor means for driving said additively rotating element continuously at a given speed and said subtractively rotating element continuously at a speed such that the action of said subtractively rotating element nullifies the action of said additively rotating element upon said counter in each cycle in which the signal determines a given minimum period of engagement between said counter and said additively rotating element.

IRVING O. MINER.